H. P. GAGE.
CONDENSER.
APPLICATION FILED AUG. 27, 1918.

1,333,303.

Patented Mar. 9, 1920.
2 SHEETS—SHEET 1.

Inventor
Henry Phelps Gage
By Dorsey Cole
Attorney

H. P. GAGE.
CONDENSER.
APPLICATION FILED AUG. 27, 1918.
1,333,303.
Patented Mar. 9, 1920.
2 SHEETS—SHEET 2.
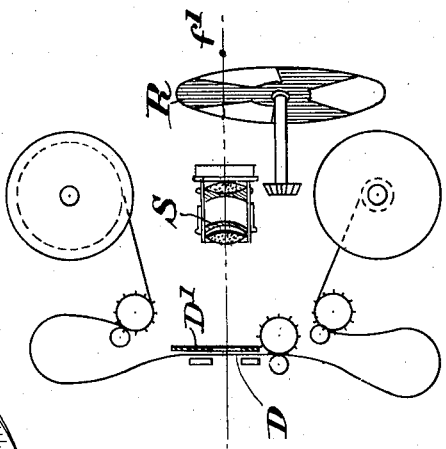
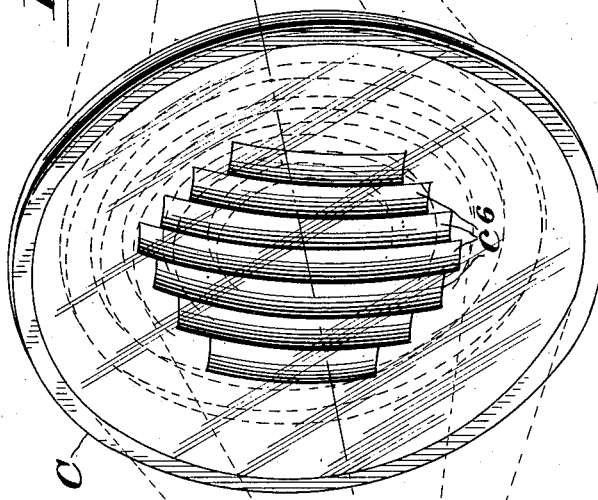
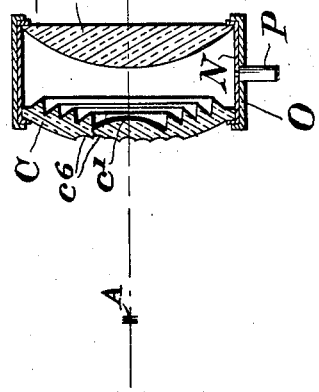
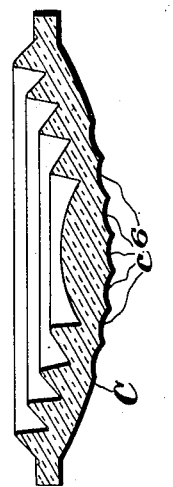
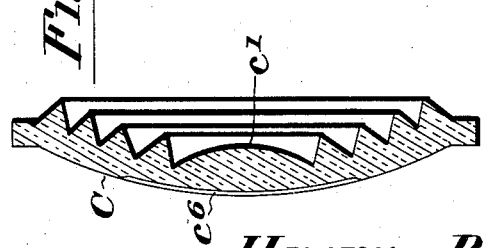
Inventor
Henry Phelps Gage
By [signature]
Attorney

UNITED STATES PATENT OFFICE.

HENRY PHELPS GAGE, OF CORNING, NEW YORK, ASSIGNOR TO CORNING GLASS WORKS, OF CORNING, NEW YORK, A CORPORATION OF NEW YORK.

CONDENSER.

1,333,303.   Specification of Letters Patent.   Patented Mar. 9, 1920.

Application filed August 27, 1918. Serial No. 251,665.

*To all whom it may concern:*

Be it known that I, HENRY PHELPS GAGE, a citizen of the United States of America, and a resident of Corning, New York, have invented certain new and useful Improvements in Condensers, of which the following is a specification.

In a prior application, Serial No. 197,272, filed by myself and William Churchill October 18, 1917, for "Condensing systems for optical projecting apparatus", is described a condenser for use in projecting apparatus consisting of a Fresnel lens having the several zones thereon so shaped that the lens as a whole has a negative spherical aberration.

The construction shown in such prior application requires that the full concentration of the beam be due to the Fresnel lens, and may result in the formation of dark bands between the annular beams projected by the concentric zones of the lens. I now propose to avoid this defect, by using a Fresnel lens as one element of a compound condenser, the other element or elements of which is, or are, lenses of the usual type, that is to say, solid lenses, either aplanatic or having positive spherical aberration, and to give to the Fresnel negative spherical aberration sufficient to create the amount of resultant negative spherical aberration desired in the system. By this means the amount of concentration to be obtained by the Fresnel lens is much reduced, with a reduction in the width of the dark bands produced thereby.

While the structure disclosed in such prior application is efficient in producing a uniformly lighted field from lamps with concentrated light filaments, one feature of my present invention is directed to obtaining such a field from light sources made up of a series of luminous bands more separated from each other than is practical for use in connection with the subject-matter of the prior application. This I accomplish by forming a series of flutes across the center of the condensing lens, such flutes being parallel with the axis of the bands of the light source whereby the image of each band is broadened and diffused laterally.

A further feature of this invention relates to means whereby an optical system embodying a fluted condensing lens, may be experimentally focused by bringing the light source to a sharp focus at a selected plane. Obviously, this is impossible with parallel flutes and illuminated bands, and to permit such method of focusing in a lens having such flutes, I so mount the fluted condensing lens and the source of illumination that the one may be shifted through a vertical angle of ninety degrees in respect to the other during focusing, whereby a sharp image of the several bands may be obtained in spite of the flutes.

My invention further consists in the construction, arrangement, and combination of the various parts of which it is composed as will be hereinafter described and claimed.

For the purposes of illustration, reference is had to the accompanying drawings in which,—

Fig. 5 is a perspective view showing a Fresnel lens constructed in accordance with this invention as used in connection with a non-concentrated banded light source.

Fig. 6 is a horizontal section, and Fig. 7 is a vertical section through a lens such as shown in Fig. 5.

Fig. 8 is a sectional view illustrating an arrangement by which a fluted condenser may be experimentally focused when used in connection with a banded light source.

Figure 1:
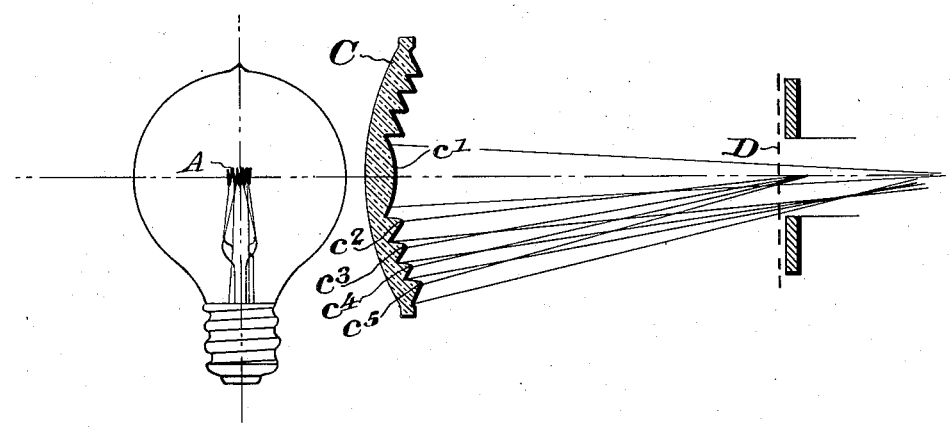
Figure 1 is a diagrammatic view illustrating the action of a Fresnel condensing lens with negative spherical aberration as the same is shown in the said prior application of Gage and Churchill.

Considering Fig. 1, which is a diagram representing the principles upon which the said prior application is based, it will be noted that the central bull's eye $c'$ of the inverted Fresnel lens C, focuses light from the source A, somewhat beyond the plane D occupied by the picture to be projected, and that the rays from the several zones $c^2$, $c^3$, $c^4$, $c^5$, cross the principal axis at different points between such front conjugate focus of the bull's eye, and the plane D, the beams from the several zones overlapping each other and the beam from the bull's-eye at the plane of the picture to be projected, so that each point of the light source is represented at the plane D by a bright spot whose brightness is diminished toward its margin, the bright spot formed by adjacent points of the light source overlapping each other to produce a uniform field of illumination.

Figure 2:
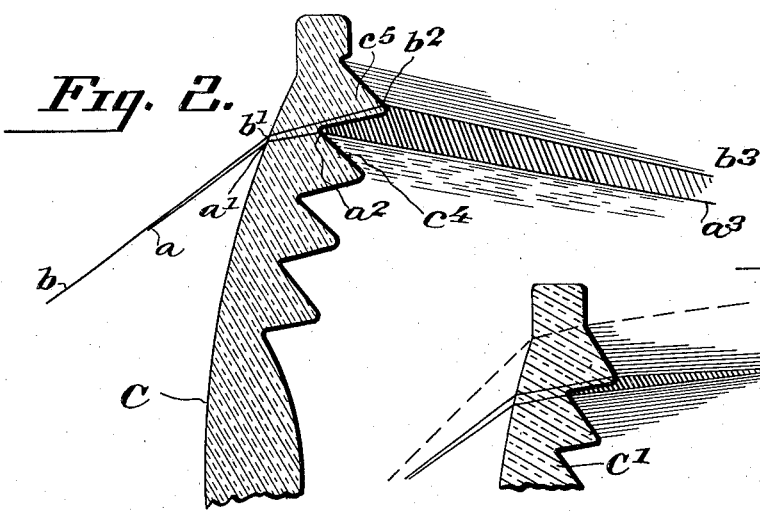
Fig. 2 is a detail of a part of Fig. 1 showing the manner in which the dark zones are formed in such a lens between the annular beams projected by the adjacent zones.
Figure 3:
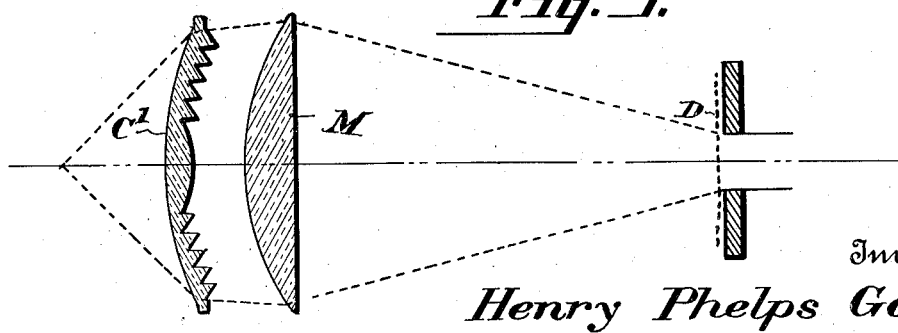
Fig. 3 is a vertical section through a doublet condenser, having a negative spherical aberration, and embodying a Fresnel lens, and designed to reduce the dark spaces shown in Fig. 2.

Referring to Fig. 2, which is an enlargement of a part of Fig. 1, it will be seen that a ray $a$—$a'$ emanating from the light source and striking the rear face of the Fresnel lens is refracted thereby so it passes through the outer edge of the zone $c^4$ at $a^2$, by the front face of which it is refracted toward the principal axis, say to $a^3$. Another ray $b$—$b'$ striking the rear face of the lens at $b'$, immediately adjacent to $a'$, after refraction by the rear face of the Fresnel lens, passes just outside of the zone $c^4$, and striking the face of the zone $c^5$ at $b^2$, is also refracted toward the principal axis say, to $b^3$. In the figure in question, the distance between the points $a'$ and $b'$ is shown exaggerated for the purposes of illustration, but in practice such points may be actually adjoining. The front face of the Fresnel lens between $a^2$ and $b^2$ does not therefore project any rays toward the picture to be illuminated, so that a dark zone represented in Fig. 2 as shaded, is formed between the annular rays projected by $c^4$ and $c^5$. Obviously, the width of this band is increased as the angular divergence between $a^2$, $b^2$, and $a^2$, $a^3$ increases, and decreases with the decrease of that angle, which in turn, however, increases with an increase of the condensing power of the lens. If, the Fresnel lens is the only condensing element used, this power must necessarily be relatively great with a correspondingly relative wide dark band between the annular beam. In order to avoid the objection above pointed out, and at the same time utilize a Fresnel lens as a convenient means for obtaining a condenser with negative spherical aberration, I may use such a Fresnel lens as one member of the condensing doublet, the other member of which is in the form of a solid lens. This is illustrated in Fig. 3, in which C' is the Fresnel lens, and M a plano-convex lens having its convex side toward the light source and the Fresnel lens. The optical constants of the two lenses are so selected that with them the light source will illuminate the plane D of the picture to be projected in the manner before described in connection with Fig. 1. This is accomplished by so constructing the zones in the Fresnel lens that they have a negative spherical aberration not only sufficient to neutralize any positive spherical aberration present in the lens M, but also to give the desired excess negative spherical aberration.

Figure 4:
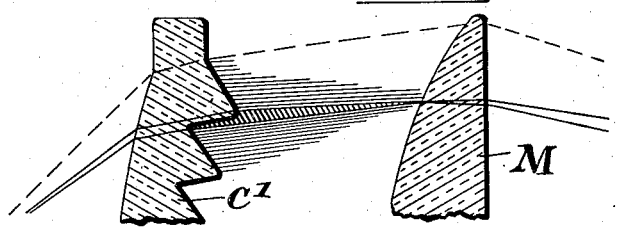
Fig. 4 is a detail of a part of Fig. 1, showing in comparison with Fig. 2, the reduction of dark bands due to using a Fresnel lens as one element of a compound condenser.

With the doublet above described, and with a condenser of given focal length, it will be noted that the condensing power of the Fresnel C' is less than that of the Fresnel C when used above as in Fig. 1, and hence the width of the dark band shown in Fig. 2 is reduced from that shown therein, as is seen by comparing Figs. 2 and 4.

Where the source of illumination consists of parallel bands which are not placed close together, I prefer to provide means for assisting the zones in securing even illumination on the picture plane from points situated at the same level on the adjacent bands. As shown in Figs. 5, 6 and 7, this may be done by a series of flutes or grooves $c^6$ formed in the otherwise smooth back surface of the Fresnel condenser C, opposite its central bull's eye, and the two inner zones, it having been found by experiment that, generally speaking, it is not necessary to extend the flutes to opposite the outer zones. Such flutes, when the condenser is in use, should be parallel with the bands of the light source and cause a side dispersion of light falling thereon, and therefore a widening of illumination caused by each filament at the image plane D, and a consequent overlapping of such illumination. It is obvious that this feature of my invention is applicable both to a Fresnel lens forming either the whole of the condenser, or to one forming only a single element of a compound condenser, and it is shown in this latter combination in Fig. 8.

It is frequently desirable to experimentally set the light source in respect to the condenser. This is possible by bringing the image of the light source as formed by the bull's eye and the projecting lenses used as a doublet to a sharp focus at a plane, properly selected in view of the characteristics of the condenser. This arrangement, which is not claimed herein, but is to form the matter of another application, is however, complicated, if the Fresnel lens is fluted at the bull's eye $c'$, due to horizontal diffusion of the filament image. In order to permit the use of such a Fresnel lens with this method of focusing, I mount one of the elements (i. e., the light source or Fresnel lens) to rotate around the optical axis of the system. In Fig. 8 which illustrates this feature of my invention as applied to a moving-picture projector, it is the condensing lens which is so mounted, its mounting N being carried in a suitable ring O for this purpose, in which ring it may be turned by the handle P, so that during focusing the flutes will be horizontal, and in projecting will be vertical and parallel with the axis of the filament bands.

An arrangement of parts permitting this experimental method of focusing is one in which they are related as follows:

The condensing lens as a whole should be of such a character that with the light source at a given point, (which is the location to be determined experimentally), and disregarding the action of the objective lens S, the rays from the light source passing through the bull's-eye of the Fresnel element should have a conjugate focus slightly in front (beyond) the front of the objective (say at $f'$) and also in front of the shutter R, and the condensing lens should produce, as above described, a diffused illumination at the image plane D. The condenser is set by measurement according to the constant to which it has been constructed at the proper distance behind the aperture plate to accomplish this diffused illumination. The objective lens S should, of course, be capable of projecting a sharp image of the aperture in the plate D' at the image plane on the picture curtain, and the shutter R should be at such a distance in front of the objective lens that the latter when at some definite position, namely, in position to produce a conjugate focus of the plate D' at the picture curtain, will, as a doublet with the bull's eye of the condensing element, focus rays from the properly located light source on the shutter. The parts should be so related that the shutter location is close to the front of the objective lens.

With the parts so related and the flutes on the Fresnel lens at right angles to the bands of the light source, the objective is moved back and forth until the aperture plate D' is focused on the picture curtain. The light source is then moved back and forth until the filament is focused sharply on the shutter, which will be the desired position. The lamp being thus properly located, the condenser may be rotated through an arc of 90° to bring the flutes into parallelism with the bands of the light source to diffuse the illumination at the image plane.

Obviously, the shutter R may be replaced by any suitable screen adapted to receive the image of the light source and properly positioned in accordance with the rule before laid down.

Having thus described my invention what I claim is:—

1. A condenser for a projecting apparatus, comprising two elements, one being a lens having positive spherical aberration and the other being a Fresnel lens having negative spherical aberration in amount sufficient to cause points on the light source to be thrown on the plane of the picture to be projected in the form of a centrally highly illuminated spot surrounded by a less bright margin.

2. A condenser system for a projecting apparatus, comprising two elements, one being a lens having positive spherical aberration and the other being a Fresnel lens having negative spherical aberration sufficient to more than neutralize the positive spherical aberration produced in the condenser due to the action of the other condenser element.

3. A condenser system for a projecting apparatus, comprising two elements, one being a solid lens having positive spherical aberration and the other being a Fresnel lens having negative spherical aberration sufficient to more than neutralize the positive spherical aberration of the resultant beam due to the first named lens.

4. In a condensing system for projecting apparatus, the combination with a light source containing substantially parallel and straight luminous bands, of a condensing lens having a series of diffusing flutes thereon substantially parallel with such bands.

5. In a condensing system for projecting apparatus, the combination with a light source containing substantially parallel and straight luminous bands, of a condensing lens comprising a Fresnel lens having negative spherical aberration and having across the central part thereof flutes substantially parallel with such bands.

6. In an optical projector, the combination with a light source including substantially parallel and straight luminous narrow bands, of a condenser having negative spherical aberration and having a series of diffusing flutes thereon, a picture to be projected and to be illuminated by the light source and condensing lens, an objective lens, a screen so located that when the light source is focused thereon by the combined action of the condenser bull's eye and the objective acting together as a single optical system, the several points of the light source will each illuminate a region of such picture, the several regions of illumination overlapping each other, and means for turning the condenser around the principal axis of the system to render the flutes parallel with the luminous bands or projection and at right angles thereto for focusing.

7. In an optical projector, the combination with a light source including substantially parallel straight luminous narrow bands, of a condenser having negative spherical aberration and having a series of diffusing prisms thereon, a picture to be projected and to be illuminated by the light source and condensing lens, an objective lens, a screen to receive the image of the light source, the condenser and objective lens together having conjugate foci at the light source and screen when the light-source is properly placed to illuminate the picture to be projected, and the objective is at a given point, and means for turning the condenser around the principal axis of the system to render the flutes parallel with the luminous bands for projection and at right angles thereto for focusing.

In testimony whereof I have signed my name.

HENRY PHELPS GAGE.